(No Model.) 2 Sheets—Sheet 1.

L. E. BARBEAU.
APPARATUS FOR STONING AND WASHING GRAIN.

No. 567,956. Patented Sept. 22, 1896.

Witnesses.
J. D. Kingsbury
G. A. Tauberschmidt

Inventor.
Louis E. Barbeau
By Whitaker & Prevost attys.

(No Model.)

L. E. BARBEAU.
APPARATUS FOR STONING AND WASHING GRAIN.

No. 567,956. Patented Sept. 22, 1896.

UNITED STATES PATENT OFFICE.

LOUIS EVARIST BARBEAU, OF LONDON, ENGLAND.

APPARATUS FOR STONING AND WASHING GRAIN.

SPECIFICATION forming part of Letters Patent No. 567,956, dated September 22, 1896.

Application filed November 29, 1895. Serial No. 570,454. (No model.)

*To all whom it may concern:*

Be it known that I, LOUIS EVARIST BARBEAU, a subject of the Queen of Great Britain, residing at London, England, have invented new and useful Improvements in Apparatus for Stoning and Washing Grain, of which the following is a specification.

This invention relates to a machine or apparatus for stoning and washing or damping wheat and other grain.

Figure 1:
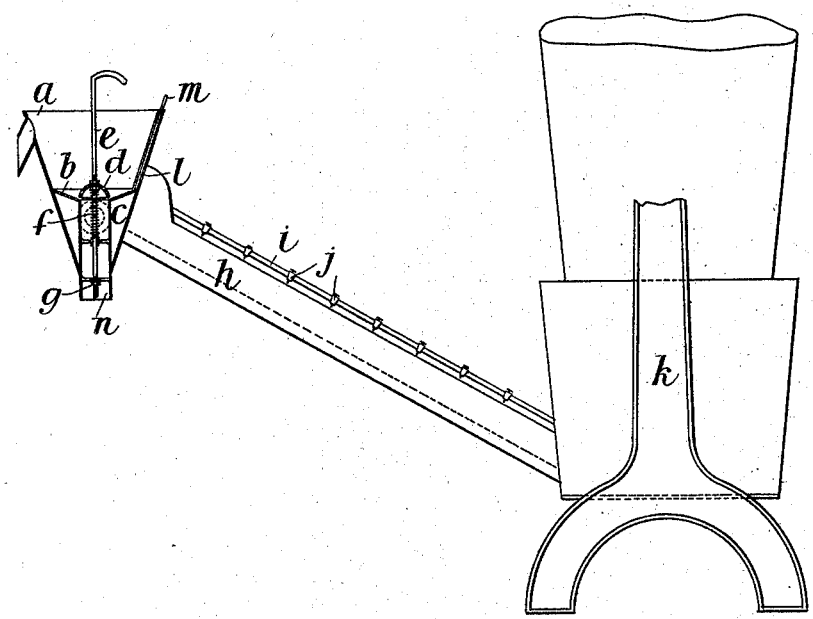
Figure 2:
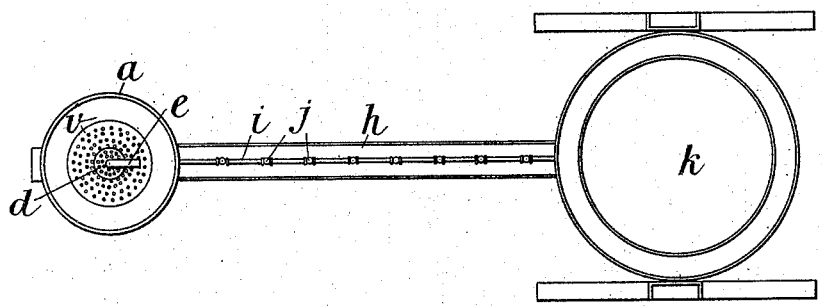
Figure 3:
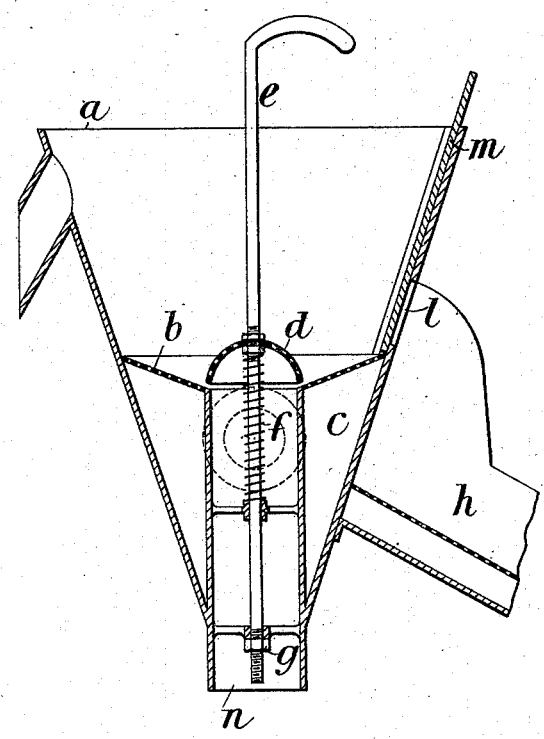

In the accompanying drawings, Figure 1 is an elevation, partly in section, of an apparatus constructed according to this invention for stoning and washing or damping grain. Fig. 2 is a plan of the same. Fig. 3 is a sectional view of the vat and connected parts.

In carrying out the invention a conical vat $a$ is provided, in which is placed a perforated partition $b$, leaving an annular chamber $c$ underneath for water.

Arranged centrally of the vat and extending from the bottom of the same to the partition $b$ is a vertical tube forming a passage-way through the annular chamber $c$. At the upper end of the said passage-way is placed the perforated cover $d$, which is preferably made in an arched or approximately semispherical shape.

The cover $d$ is secured to a regulating-rod $e$, which passes through said cover $d$ and extends through the entire depth of the vat $a$. The upper end, extending above the vat $a$, is provided with a suitable handle, while the lower end is screw-threaded and extends below a cross-piece or spider in the central passage-way. A nut $g$ is screwed on the lower threaded end of the rod $e$ below said cross-piece, thus limiting the upward movement of the rod $e$ and cover $d$. A spring $f$, surrounding the rod $e$, is interposed between the cover $d$ and another cross-piece in the central passage-way, which normally tends to hold the said cover up to the full limit allowed by the position of the nut $g$ on the rod $e$.

It will be seen from the foregoing description that the cover $d$ can be easily and quickly adjusted to a greater or less distance above the upper mouth of the central passage-way and thus regulate the discharge of the stones which may be separated from the wheat.

By this construction any kernels of the grain which might have a tendency to descend too low in the water and be in danger of loss through the central passage-way are arrested by the perforated cover, deflected laterally into the path of the currents of water entering through the perforated partition-surface, so as to be buoyed up again, and discharged in the manner hereinafter described, while the stones being heavy will pass to one side of said cover and fall through the central passage.

By reference to the drawings it will be seen that the perforated cover is of greater diameter than the central opening in the partition $b$, and that said cover is so held that its edges lie above and extend over the perforated partition.

To the vat is attached an inclined open spout or trough $h$, perforated at the bottom, over which is placed a water-pipe $i$, provided with small taps $j$, so that a supply of clean water can be discharged onto the grain for rinsing purposes as it passes down the spout to a drying-cylinder or other suitable drying apparatus $k$.

The action of the machine is as follows: Water under pressure is allowed to enter the space $c$, which escapes through the perforations in the partition $b$ into the vat $a$. The grain is fed into the vat by a pipe or spout placed perpendicularly over the center at about eighteen inches over the top of the vat, so that when the grain strikes the water it will be supported by the pressure of water passing through the perforations. The water and grain then pass through the aperture $l$ into the spout $h$, which aperture is adjustable by means of a slide $m$, the water passing through the perforations in the spout. Clean water is run onto the grain by means of the pipe $i$ and taps $j$, thus rinsing it. The grain then passes to the drier $k$. The stones pass out of the vat at $n$.

By reason of the construction of the cover $d$, previously described, it will be observed that any material falling thereon will be deflected laterally beyond the edges of the central aperture in the partition $b$ and directly into the currents of water flowing upward through the perforations in the partition, thus securing a complete separation of the grain from stones and other foreign matter, which might otherwise carry some grain with them as they are discharged through the central opening.

Having now particularly described and ascertained the nature of my said invention and in what manner the same is to be performed, I declare that what I claim is—

1. In an apparatus for stoning and washing grain, the combination with a suitable vat, of a perforated partition in said vat, a water-receiving chamber, a grain-receiving chamber, a central passage-way for discharging stones separated from the grain, a spring-supported cover for said passage-way, and a discharge-opening in the upper part of the vat, the construction being such that the grain received in the vat is caused to be buoyed up by the water and suitably discharged therewith, while the stones sink and are allowed to escape through said central passage-way substantially as described.

2. In an apparatus for stoning and washing grain, the combination of a conical vat, for receiving grain, a perforated partition forming a water-receiving chamber in the lower part of the vat, a central tube for discharging stones separated from the grain, a perforated cover for said central tube, a rod carrying said cover, a nut on the lower end of the rod whereby the rod and cover may be adjusted, a spring adapted to hold said cover and rod normally in their adjusted position and an outlet-opening in the side of the vat for discharging the grain carried by the water, substantially as described.

LOUIS EVARIST BARBEAU.

Witnesses:
W. H. MERRITT,
W. J. BRAND.